United States Patent
Deuker et al.

(10) Patent No.: US 9,464,574 B2
(45) Date of Patent: Oct. 11, 2016

(54) METHOD FOR RUNNING UP A STATIONARY GAS TURBINE

(75) Inventors: Eberhard Deuker, Mulheim an der Ruhr (DE); Berthold Kostlin, Duisburg (DE); Jurgen Meisl, Mulheim an der Ruhr (DE); Dennis Nehlsen, Voerde (DE); Kai-Uwe Schildmacher, Mulheim an der Ruhr (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 448 days.

(21) Appl. No.: 14/233,700

(22) PCT Filed: Jul. 25, 2012

(86) PCT No.: PCT/EP2012/064564
§ 371 (c)(1),
(2), (4) Date: Jan. 17, 2014

(87) PCT Pub. No.: WO2013/014176
PCT Pub. Date: Jan. 31, 2013

(65) Prior Publication Data
US 2014/0190177 A1    Jul. 10, 2014

(30) Foreign Application Priority Data
Jul. 26, 2011    (EP) ...................................... 1175342

(51) Int. Cl.
*F02C 7/26*    (2006.01)
*F02C 9/34*    (2006.01)
(Continued)

(52) U.S. Cl.
CPC . *F02C 7/26* (2013.01); *F02C 9/34* (2013.01); *F02C 9/40* (2013.01); *F02C 9/28* (2013.01); *F05D 2270/31* (2013.01)

(58) Field of Classification Search
CPC .............. F02C 9/34; F02C 9/28; F02C 9/49; F02C 9/36; F23D 17/002; F05D 2270/31; F23R 3/28; F23R 3/343; F23R 3/36
See application file for complete search history.

(56) References Cited

U.S. PATENT DOCUMENTS 4,157,012 A * 6/1979 DuBell ................... F02C 7/232
                                                137/513.7
4,253,301 A * 3/1981 Vogt ........................ F23R 3/002
                                                60/39.463
(Continued)

FOREIGN PATENT DOCUMENTS

CN    1474061 A    2/2004
DE    19549140 A1   7/1997
(Continued)

*Primary Examiner* — Gerald L Sung
*Assistant Examiner* — Rene Ford
(74) *Attorney, Agent, or Firm* — Beusse Wolter Sanks & Maire

(57) ABSTRACT

A method for running up a stationary gas turbine is provided. The turbine has a combustion chamber, the burners of which have a pilot burner and a main burner and by which various types of fuel are introduced into the combustion chamber for burning. The method, carried out while a rotor of the gas turbine is accelerating from a standstill to a nominal speed, includes feeding fuel of a first type of fuel to the pilot burners and feeding fuel of the first type of fuel to the main burners. In order to provide a method in which a comparatively low supply pressure is required in the fuel supply system and in which combustion vibrations that put the machine at risk are avoided during the running-up process, it is proposed that fuel of a second type of fuel is fed to the burner before the nominal speed is reached.

10 Claims, 1 Drawing Sheet

(51) Int. Cl.
*F02C 9/40* (2006.01)
*F02C 9/28* (2006.01)

(56) References Cited

U.S. PATENT DOCUMENTS

| | | | | |
|---|---|---|---|---|
| 4,589,260 A * | 5/1986 | Krockow | F23D 11/005 | 60/737 |
| 4,683,715 A * | 8/1987 | Iizuka | F02C 7/26 | 60/39.41 |
| 4,735,052 A * | 4/1988 | Maeda | F02C 9/28 | 60/733 |
| 4,761,948 A * | 8/1988 | Sood | F02C 9/40 | 60/39.281 |
| 5,121,597 A * | 6/1992 | Urushidani | F02C 7/26 | 60/733 |
| 5,359,847 A * | 11/1994 | Pillsbury | F23D 17/002 | 60/39.463 |
| 5,408,825 A * | 4/1995 | Foss | F23R 3/36 | 60/39.463 |
| 5,491,970 A * | 2/1996 | Davis, Jr. | F23R 3/28 | 60/776 |
| 5,551,228 A * | 9/1996 | Mick | F23R 3/346 | 60/776 |
| 5,623,819 A * | 4/1997 | Bowker | F23C 6/047 | 60/723 |
| 5,722,230 A * | 3/1998 | Cohen | F02C 7/26 | 60/39.37 |
| 5,836,164 A * | 11/1998 | Tsukahara | F23C 6/047 | 60/733 |
| 6,148,603 A | 11/2000 | Althaus | | |
| 6,201,029 B1 * | 3/2001 | Waycuilis | C01B 3/382 | 252/373 |
| 6,279,310 B1 * | 8/2001 | Strand | F02C 7/264 | 60/39.463 |
| 6,367,239 B1 | 4/2002 | Brown | | |
| 6,434,945 B1 * | 8/2002 | Mandai | F23D 11/38 | 60/39.3 |
| 6,640,548 B2 * | 11/2003 | Brushwood | F01D 17/08 | 60/39.463 |
| 6,813,889 B2 * | 11/2004 | Inoue | F23R 3/10 | 60/737 |
| 6,986,254 B2 * | 1/2006 | Stuttaford | F23R 3/286 | 60/39.281 |
| 7,464,555 B2 * | 12/2008 | Bachovchin | F02C 3/28 | 60/723 |
| 7,546,735 B2 * | 6/2009 | Widener | F02C 3/20 | 60/737 |
| 8,056,344 B2 * | 11/2011 | Remy | F02C 3/30 | 60/39.281 |
| 8,899,048 B2 * | 12/2014 | Prociw | F23R 3/346 | 60/737 |
| 9,003,804 B2 * | 4/2015 | Prociw | F23R 3/346 | 60/740 |
| 2001/0004827 A1 * | 6/2001 | Vandervort | F23R 3/14 | 60/39.55 |
| 2004/0172951 A1 | 9/2004 | Hannemann | | |
| 2004/0221582 A1 * | 11/2004 | Howell | F23R 3/343 | 60/778 |
| 2006/0101814 A1 * | 5/2006 | Saitoh | F23R 3/343 | 60/377 |
| 2007/0003897 A1 * | 1/2007 | Koizumi | F23R 3/28 | 431/354 |
| 2008/0044782 A1 | 2/2008 | Kostlin | | |
| 2009/0173057 A1 | 7/2009 | Hirata | | |
| 2009/0223228 A1 * | 9/2009 | Romoser | F02C 7/264 | 60/776 |
| 2010/0050652 A1 | 3/2010 | Skipper | | |
| 2010/0170266 A1 * | 7/2010 | Dinu | F02C 3/20 | 60/787 |
| 2011/0016873 A1 * | 1/2011 | Nakamura | F02C 9/34 | 60/772 |
| 2011/0289932 A1 * | 12/2011 | Thompson | F02C 3/30 | 60/776 |
| 2012/0042658 A1 * | 2/2012 | Eto | F02C 3/22 | 60/778 |
| 2012/0247116 A1 * | 10/2012 | Meeuwissen | F02C 3/22 | 60/772 |
| 2013/0029277 A1 * | 1/2013 | Koizumi | F23R 3/10 | 431/354 |
| 2013/0086918 A1 * | 4/2013 | Bothien | F02C 9/26 | 60/776 |
| 2013/0091824 A1 * | 4/2013 | Murakami | F01D 25/12 | 60/39.094 |

FOREIGN PATENT DOCUMENTS

| | | |
|---|---|---|
| EP | 1008737 A2 | 6/2000 |
| EP | 1277920 A1 | 1/2003 |
| EP | 1655456 A2 | 5/2006 |
| EP | 1944547 A1 | 7/2008 |
| WO | 2006053866 A | 5/2006 |

* cited by examiner

METHOD FOR RUNNING UP A STATIONARY GAS TURBINE

CROSS REFERENCE TO RELATED APPLICATIONS

This application is the U.S. National Stage of International Application No. PCT/EP2012/064564 filed Jul. 25, 2012, and claims the benefit thereof. The International Application claims the benefit of European Application No EP11175342 filed Jul. 26, 2011. All of the applications are incorporated by reference herein in their entirety.

FIELD OF INVENTION

The invention relates to a method for running up a stationary gas turbine having at least one combustion chamber, the burners of which comprise a pilot burner and a main burner and by which different fuels are introduced into the combustion chamber for combustion, including—delivery of fuel of a first fuel type to the pilot burners and—delivery of fuel of the first fuel type to the main burners being carried out during the acceleration of a rotor of the gas turbine from standstill up to a nominal rotational speed.

BACKGROUND OF INVENTION

Stationary gas turbines and methods for operating the gas turbines are known in many different forms from the available prior art. Gas turbines of modern type of construction, which are used for generating electrical energy, usually have an axial-throughflow compressor, one or more combustion chambers and a turbine unit. In operation, a fuel delivered to the combustion chamber is burnt with the aid of the ambient air compressed by the compressor, to form a hot gas which expands in the turbine unit at the rotor of the gas turbine so as to perform work. The rotor then drives a generator which converts the mechanical energy into electrical energy with low loss and feeds it into a power distribution network.

When the gas turbine is started, what is known as the start-up or run-up, its rotor is brought to an ignition rotational speed with the aid of a drive device, after which a pilot fuel stream, by being fed into the combustion chamber, is ignited. The pilot flame subsequently ignites a main fuel stream which is also injected into the combustion chamber or combustion chambers via separate burners and/or fuel nozzles.

According to the book "Stationäre Gasturbinen" ["Stationary Gas Turbines"] by Christoph Lechner and Jörg Seume (publishers) the drive device is decoupled from the rotor at a rotational speed of 50% to 80% of the nominal rotational speed. The rotor is then accelerated solely by the hot gas occurring during combustion. When the nominal rotational speed, mostly 3000 min$^{-1}$ or 3600 min$^{-1}$, is reached, the operation to start the gas turbine ends. The generator can subsequently be synchronized with the network frequency of the power distribution network and be locked onto this.

The delivery of pilot fuel and main fuel to the corresponding burners or nozzles takes place via separately operating line systems with valves which are arranged in them and by means of which the volume and the fuel delivered in each case and its pressure can be set.

Both liquid and gaseous fuels are used as fuel. To generate especially efficient and low-emission combustion in the combustion chamber, it is known to assist the combustion of the main fuel mass flow constantly by means of the pilot flame. A fuel gas, for example natural gas, is often used as pilot fuel.

On account of the large quantities of gaseous fuel which are required in order to generate large quantities of electrical energy, the fuel line systems of the gas turbine are often connected to a fuel network, from which the fuel can be extracted permanently in the required quantity over a lengthy period of time. If appropriate, an additional gas compressor is also connected between the fuel network and the fuel line system, in order to raise the supply pressure of the fuel network dependably to a higher degree whereby it can be ensured that the gas turbine operates reliably. The fuel pressure required for feeding into the combustion chamber in this case lies above the pressure ratio afforded by the compressor of the gas turbine. Consequently, the fuel pressure is set such that fuel in the required quantity also flows in actual fact into the combustion chamber.

The supply pressure to be provided by the fuel network or to be delivered by the additional gas compressor can even lie well above the pressure ratio afforded by the compressor, since very large quantities of pilot fuel are required particularly during the acceleration of the rotor to nominal rotational speed and during load shedding. Moreover, pilot burners which generate a premixed flame, what are known as premix pilot burners, have comparatively small gas outlet bores which necessitate a further increase in the gas supply pressure which is in any case already high, in order to achieve the required mass flows of pilot gas. This contradicts the need for the possibility of efficient operation even when the supply pressure in the fuel network is reduced.

Moreover, a method for starting a gas turbine operated with low-calorie gas is known from WO 2006/053866 A1. Synthesis gas is injected as low-calorie gas into the combustion chamber of the gas turbine via a pilot burner and a main burner. So as not to undershoot a minimum pressure loss in spite of a comparatively low fuel mass flow, which would lead to too low an outflow velocity, WO 2006/053866 A1 proposes to admix an inert medium to the synthesis gas. However, this has the disadvantage that a high supply pressure is still necessary overall.

SUMMARY OF INVENTION

An object herein is to provide a method, by means of which an improved procedure for starting the gas turbine is obtained and the disadvantages arising from the prior art indicated are avoided.

This object is achieved by means of a method s described herein. Advantageous refinements and further features are in this case also specified herein.

The invention is based on the recognition that, even during run-up, mixed operation with two different fuel types is possible in order to provide the thermal energy required for accelerating the rotor. Only one fuel type, mostly only natural gas or only fuel oil, has hitherto been used in the prior art. The invention thus departs from the previous procedure and proposes that fuel of a second fuel type is delivered to at least one burner before the nominal rotational speed is reached.

This procedure is advantageous particularly for gas turbines in which a gaseous fuel, mostly natural gas, and a liquid fuel, mostly fuel oil, are used. Particularly in this case, the otherwise comparatively large quantity of fuel of the first fuel type for the pilot burner can partially be substituted for a short time, during the starting phase, by fuel of a second fuel type. In particular, high-calorie fuels are suitable for substitution. With the aid of this mixed operation, for example, combustion oscillations can be reduced, thus improving the operation of the gas turbine. Preferably, in this case, the fuel of the second fuel type is delivered to correspondingly designed pilot burners, with the result that the fuel quantity of the first fuel type to the pilot burners can be initially reduced. The burners then consequently comprise a two-stage pilot burner. In principle, the fuel of the second fuel type can be delivered to the burners either before or after the activation of the delivery of fuel of the first fuel type to the main burners during start-up.

Preferably, however, the activation of the delivery of fuel of the second fuel type to the burners takes place only after the fuel of the first fuel type has been delivered to the main burners. In this case, especially dependable combustion of the fuels introduced into the combustion chamber can be achieved.

In this case, the main burners are preferably configured as premix burners, thus allowing low-emission combustion of the fuel.

The quantity of fuel of the second fuel type is initially increased, while the fuel quantity of fuel of the first fuel type is reduced. This is intended to prevent an unreliably high acceleration of the rotor. In this case, only such a quantity of fuel of the first fuel type is to be fed in as would be possible as a result of the supply pressure present in any case in the fuel line, that is to say without an additional compressor. In principle, however, fuel of the first fuel type is mainly burnt during the acceleration of the rotor to the nominal rotational speed. The quantity of fuel of the second fuel type is comparatively low during the run-up of the gas turbine.

The refinement is especially preferred in which the first fuel type is gaseous and the second fuel type liquid. In this case, when the gas turbine is started with natural gas, a small part of the pilot gas quantity is replaced by a pilot oil quantity with the result that the pilot gas quantity required for the run-up process can be reduced overall. As a result of the reduction in the pilot gas quantity, the maximum supply pressure in the natural gas supply network can also be lower than hitherto, thus avoiding the need for additional structural elements in the natural gas supply system for increasing the pressure.

BRIEF DESCRIPTION OF THE DRAWINGS

Further advantages and features of the invention are explained in more detail in the following exemplary embodiment by means of a drawing in which.

DETAILED DESCRIPTION OF INVENTION

Figure 1:
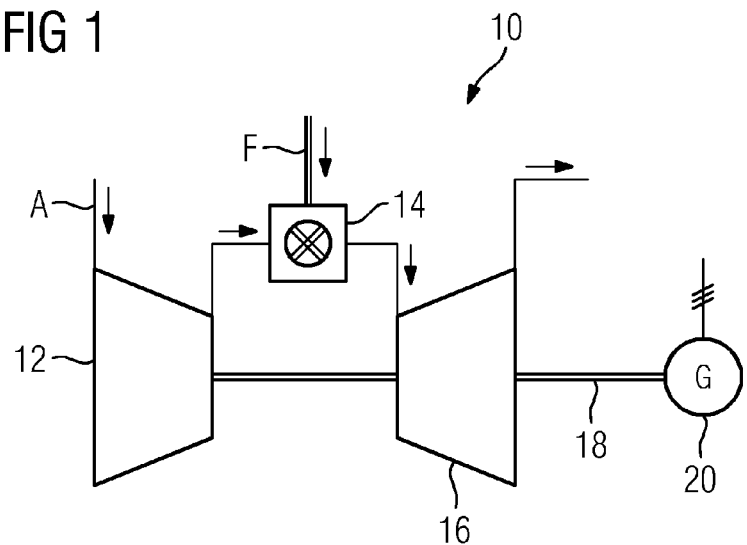
FIG. 1 shows diagrammatically the set-up of a gas turbine.

FIG. 1 shows diagrammatically the set-up of a stationary gas turbine 10 with a compressor 12, a combustion chamber 14 and a turbine 16 and also a generator 20 coupled to a rotor 18 of the gas turbine 10. Conventionally, both the compressor 12 and the turbine 16 are designed as axial-throughflow turbomachines. The combustion chamber 14 may be designed both as an annular combustion chamber, as two silo combustion chambers or as a plurality of tubular combustion chambers distributed uniformly around the circumference of the machine axis. In each combustion chamber 14, at least one burner for delivering fuel F into the combustion chamber is provided. A plurality of burners may also be provided for each combustion chamber. Each burner comprises at least one pilot burner and at least two main burners for two different fuel types. Such burners are also known as dual fuel burners.

To start up the gas turbine 10, the rotor 18 of the gas turbine 10 is accelerated from standstill via a rotary device, not illustrated in more detail. With the rotation of the rotor 18, the compressor 12 sucks in ambient air and pumps this into the combustion chamber 14. As early as when the rotational speed is still low, fuel F is delivered to the combustion chamber 14 via the pilot burners of the gas turbine 10 and ignited. The pilot fuel and the compressed air subsequently burn in the combustion chamber 14 or in the combustion chambers to form a hot gas which expands in the turbine 16, on the turbine blades arranged therein, so as to perform work. The expanded smoke gas is then discharged via a chimney or delivered to a waste heat recovery steam generator.

Figure 2:
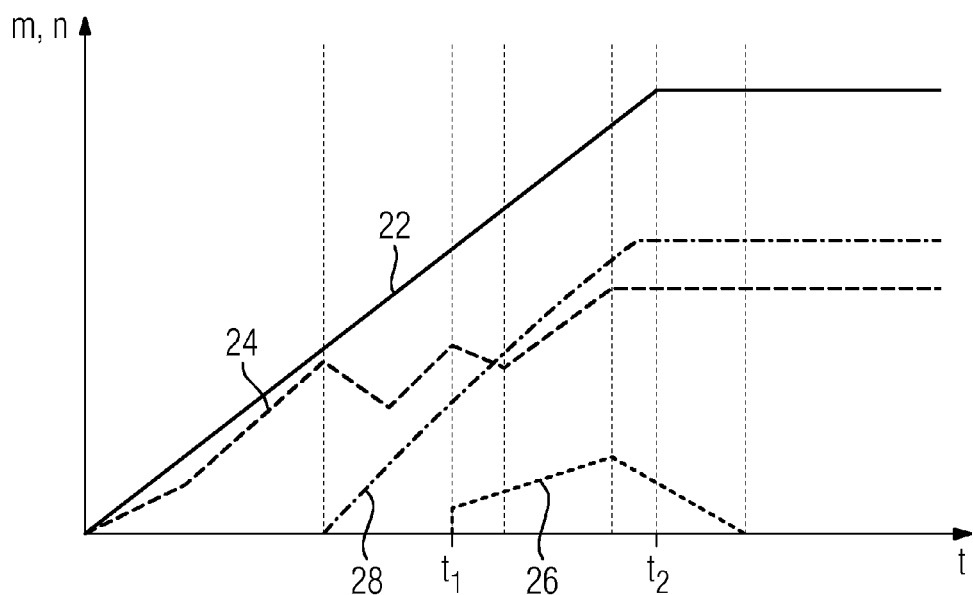
FIG. 2 shows a rotor rotational speed/fuel quantity time graph of the start-up process for accelerating the rotor of the gas turbine from standstill up to a nominal rotational speed.

The method for running up the rotor of a gas turbine from standstill up to the nominal rotational speed without load (also called full speed no load, FSNL) is shown in the graph illustrated in FIG. 2. Both the fuel mass flow m and the rotor rotational speed n are illustrated against the time t in the graph.

A first characteristic curve 22 shows the rotor rotational speed n against the time t. A second characteristic curve 24 shows the mass flow m of the fuel of the first fuel type delivered overall to the pilot burners. A third characteristic curve 26 shows the mass flow of the fuel of the second fuel type delivered to the pilot burners. A fourth characteristic curve 28 shows the mass flow of the fuel of the first fuel type delivered to the main burners.

The method for starting, that is to say running up the stationary gas turbine 2 is explained in more detail below by means of the graph illustrated in FIG. 2, and in this case the first fuel type may be gaseous and therefore, for example, natural gas and the second fuel type may be liquid and therefore, for example, oil.

After the acceleration of the rotor 18 from standstill, fuel of the first fuel type is delivered in an increasing quantity to the pilot burners. This is evident from the characteristic curve 24. With the delivery of the first fuel type, natural gas, to the main burners, the pilot gas quantity of natural gas can for the first time be reduced for a short period of time, after which the pilot gas quantity is then increased again. At the time point t1, a fuel quantity of a second fuel type, to be precise oil, is introduced into the combustion chamber 14 and is burnt there. At the same time, the fuel quantity of the first fuel type to the pilot burners is slightly reduced. Part of the pilot gas quantity is consequently replaced by a pilot oil quantity. Mixed combustion therefore then proceeds, in which fuels of different types are burnt simultaneously to form the hot gas.

The further acceleration of the rotor subsequently takes place by the increase of thermal energy. For this purpose, simultaneously, the oil quantity introduced and the fuel quantity of fuel of the first fuel type delivered via the main burners are constantly increased. When the nominal rotational speed is reached at the time point t2, the process of starting the gas turbine 10 is concluded.

Thereafter, the quantity of fuel of the second fuel type delivered via the oil pilot burners can be reduced to zero, with the result that mixed operation is ended for the first time.

Overall, the invention relates to a method for running up a stationary gas turbine 10 having at least one combustion chamber 14, the burners of which comprise a pilot burner and a main burner and by which different fuel types are introduced into the combustion chamber 14 for combustion, the steps:—delivery of fuel of a first fuel type to the pilot burners and—delivery of fuel of the first fuel type to the main burners being carried out during the acceleration of a rotor 18 of the gas turbine 10 from standstill up to a nominal rotational speed.

In order to provide a method in which a comparatively low supply pressure is required in the fuel supply system and in which machine-endangering combustion oscillations are avoided during the run-up, it is proposed that fuel of a second fuel type is delivered to the burner before the nominal rotational speed is reached.

The invention claimed is:

1. A method for running up a stationary gas turbine having at least one combustion chamber, the burners of which comprise a pilot burner and a main burner and by which different fuel types are introduced into the combustion chamber for combustion, the method comprising:
    delivering of fuel of a first fuel type to the pilot burners; and
    delivering of fuel of the first fuel type to the main burners;
    wherein the steps are carried out during the acceleration of a rotor of the gas turbine from standstill up to a nominal rotational speed, wherein fuel of a second fuel type is delivered to at least one burner before the nominal rotational speed is reached, and
    wherein the delivery of fuel of the second fuel type takes place only after the delivery of fuel of the first fuel type to the main burners.

2. The method as claimed in claim 1, wherein the fuel of the second fuel type is delivered to the pilot burners.

3. The method as claimed in claim 1, wherein, with the delivery of fuel of the second fuel type, the fuel quantity of the first fuel type delivered to the pilot burner is initially reduced.

4. The method as claimed in claim 1, wherein one of the two fuel types is gaseous and the other of the two fuel types is liquid.

5. The method as claimed in claim 4, wherein the first fuel type is gaseous and the second fuel type is liquid.

6. A method for running up a stationary gas turbine having at least one combustion chamber, the burners of which comprise a pilot burner and a main burner and by which different fuel types are introduced into the combustion chamber for combustion, the method comprising:
    delivering of fuel of a first fuel type to the pilot burners; and
    delivering of fuel of the first fuel type to the main burners;
    wherein the steps are carried out during the acceleration of a rotor of the gas turbine from standstill up to a nominal rotational speed, and wherein fuel of a second fuel type is delivered to at least one burner before the nominal rotational speed is reached, and
    wherein, with the delivery of fuel of the second fuel type, the fuel quantity of the first fuel type delivered to the pilot burner is initially reduced.

7. The method as claimed in claim 6, wherein the fuel of the second fuel type is delivered to the pilot burners.

8. The method as claimed in claim 6, wherein the delivery of fuel of the second fuel type takes place only after the delivery of fuel of the first fuel type to the main burners.

9. The method as claimed in claim 6, wherein one of the two fuel types is gaseous and the other of the two fuel types is liquid.

10. The method as claimed in claim 9, wherein the first fuel type is gaseous and the second fuel type is liquid.

* * * * *